United States Patent
Park et al.

(10) Patent No.: US 12,298,278 B2
(45) Date of Patent: May 13, 2025

(54) BATTERY CELL WELD PORTION INSPECTION APPARATUS AND BATTERY CELL WELD PORTION INSPECTION METHOD USING THE SAME

(71) Applicant: LG ENERGY SOLUTION, LTD., Seoul (KR)

(72) Inventors: Jun Young Park, Daejeon (KR); Jung Ho Oh, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 379 days.

(21) Appl. No.: 18/084,754

(22) Filed: Dec. 20, 2022

(65) Prior Publication Data

US 2023/0204480 A1 Jun. 29, 2023

(30) Foreign Application Priority Data

Dec. 24, 2021 (KR) .................. 10-2021-0187644
Nov. 4, 2022 (KR) .................. 10-2022-0145726

(51) Int. Cl.
*G01N 3/08* (2006.01)
*H01M 10/42* (2006.01)
*H01M 10/48* (2006.01)

(52) U.S. Cl.
CPC .......... *G01N 3/08* (2013.01); *H01M 10/4285* (2013.01); *H01M 10/48* (2013.01)

(58) Field of Classification Search
CPC ..................................................... G01N 3/08
See application file for complete search history.

(56) References Cited

U.S. PATENT DOCUMENTS

| | | | |
|---|---|---|---|
| 9,863,891 B1* | 1/2018 | Lara Magallanes | G01N 21/952 |
| 2003/0146263 A1 | 8/2003 | Farassat | |
| 2022/0228849 A1* | 7/2022 | Lany | G01B 3/48 |
| 2023/0226646 A1* | 7/2023 | Bog | B23K 31/125 228/104 |
| 2024/0011927 A1* | 1/2024 | Lee | H01M 10/0422 |
| 2024/0142398 A1* | 5/2024 | Son | H01M 50/516 |
| 2024/0151589 A1* | 5/2024 | Oh | G01J 5/0205 |
| 2024/0319125 A1* | 9/2024 | Lee | H01M 10/04 |

FOREIGN PATENT DOCUMENTS

| | | |
|---|---|---|
| CN | 103575439 A | 2/2014 |
| CN | 207600646 U | 7/2018 |
| JP | 2000-074787 A | 3/2000 |
| JP | 2000-100465 A | 4/2000 |
| KR | 10-2003-0066432 A | 8/2003 |
| KR | 10-2015-0049984 A | 5/2015 |
| KR | 10-2294189 B1 | 8/2021 |

* cited by examiner

*Primary Examiner* — Eric S. McCall
(74) *Attorney, Agent, or Firm* — Morgan, Lewis & Bockius LLP

(57) ABSTRACT

A battery cell weld portion inspection apparatus may include a coupling portion configured to be coupled to a connection member coupled to a weld portion of a battery cell, a shaft including a lower end coupled to the coupling portion, a spring disposed around an outer surface of the shaft, a sensor configured to measure a movement distance of the shaft, a sensing portion coupled to an upper end of the shaft, the sensor being configured to measure the movement distance of the shaft based on a position of the sensing portion, and a case configured to receive the shaft, the sensor, and the sensing portion.

13 Claims, 3 Drawing Sheets

BATTERY CELL WELD PORTION INSPECTION APPARATUS AND BATTERY CELL WELD PORTION INSPECTION METHOD USING THE SAME

CROSS-REFERENCE TO RELATED APPLICATIONS

This application claims the benefit of priority to Korean Patent Application No. 10-2021-0187644 filed on Dec. 24, 2021, and Korean Patent Application No. 10-2022-0145726 filed on Nov. 3, 2022, the disclosures of each of which are incorporated herein by reference in their entireties.

BACKGROUND

1. Technical Field

The present disclosure relates to a battery cell weld portion inspection apparatus and a battery cell weld portion inspection method using the same. More particularly, the present disclosure relates to a battery cell weld portion inspection apparatus capable of checking welding strength of a weld portion formed so as to electrically connect battery cells to each other and a battery cell weld portion inspection method using the same.

2. Description of the Related Art

A lithium secondary battery, which is charged and discharged as the result of movement of lithium ions, has been used not only in the field of a small-sized battery cell, which is used for mobile devices or small-sized electronic products, but also in the field of a medium- or large-sized battery pack, which is used as an energy source of an electric vehicle or a power storage system that requires high output and high voltage, since the lithium secondary battery has advantages of high energy density and high discharge voltage.

Based on the shape of a battery case, the lithium secondary battery is classified as a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet. Thereamong, the cylindrical secondary battery has advantages in that the capacity of the cylindrical secondary battery is relatively large and in that the cylindrical secondary battery is structurally stable.

In order to manufacture the medium- or large-sized battery pack, it is necessary to perform a process of electrically connecting a plurality of cylindrical battery cells. For example, a metal plate may be attached to positive electrode terminals or negative electrode terminals of the cylindrical battery cells by laser welding in order to electrically connect the cylindrical battery cells to each other.

If the force of coupling between the metal plate and the cylindrical battery cells is low, the metal plate may be easily separated from the cylindrical battery cells due to impact. If the force of coupling between the metal plate and the cylindrical battery cells is high, on the other hand, gaskets may be damaged, whereby electrolytic solutions may leak or electrical connection between the cylindrical battery cells may be released.

Such problems may deteriorate performance of each cylindrical battery cell, and a safety-related problem may also occur.

Therefore, coupling strength between the metal plate and a weld portion of the cylindrical battery cells may be inspected in order to prevent the above problems.

Conventionally, a worker uses a method of pulling a wire coupled to the weld portion with a tool, such as tweezers, in order to inspect the force of coupling with the weld portion. When such a method is used, reliability in inspection depends only on the skill of the worker. Furthermore, if the pulling force is changed depending on the worker, reliability in evaluation of welding strength of the weld portion is lowered.

For example, if the pulling force is low, even a weak weld portion cannot be detected, and a determination may be made that such a product is normal. If the pulling force is high, on the other hand, the weld portion may be rather damaged.

As technology for inspecting the coupling force of the weld portion, Patent Document 1 discloses a tensile test instrument for measuring resistance in junction wire coupling, wherein a tension hook coupled to a junction wire coupled to a semiconductor circuit chip and a lead wire and a spring means configured to be coupled top a driving portion are disposed. The spring means applies initial stress to the tension hook to move the tension hook to the initial position thereof, whereby engagement between the tension hook and a wire ring is weakened and the quantity of tensile force is limited, and therefore the force measurement instrument is protected.

An object of Patent Document 1 is to provide a test instrument designed to acquire reproducible test results even when ambient temperature is variable; however, Patent Document 1 does not disclose technology capable of equalizing the force applied to the tension hook caught by the wire ring.

Patent Document 2 discloses a battery inspection apparatus that converts resistance of a weld portion between a lead and a seal generated when a predetermined tensile force is applied to the weld portion into displacement depending thereon and compares first displacement at the time when tension starts and second displacement at the time when tension ends with a critical value to determine whether a battery is normal.

As a result, technology capable of inspecting the coupling state of a weld portion under uniform conditions using a battery cell weld portion inspection apparatus having a simple structure has not yet been proposed.

3. Patent Documents (Patent Document 1) Korean Patent Application Publication No. 10-2003-0066432, dated Aug. 9, 2003.
(Patent Document 2) Japanese Patent Application Publication No. 2000-100465, dated Apr. 7, 2000.

SUMMARY

Accordingly, embodiments of the present disclosure are directed to battery cell weld portion inspection apparatus and battery cell weld portion inspection method using the same that substantially obviate one or more problems due to the limitations and disadvantages of the related art.

It is an object of the present disclosure to provide a battery cell weld portion inspection apparatus capable of rapidly and accurately determining whether a welded state is poor in the state in which conditions in which the force of coupling of a battery cell weld portion is inspected are maintained uniform and a battery cell weld portion inspection method using the same.

The features and aspects of the present disclosure are not limited to those mentioned above. Additional features and aspects will be set forth in part in the description that follows and in part will become apparent to those skilled in the art from the description or may be learned by practice of the inventive concepts provided herein. Other features and aspects of the inventive concepts may be realized and attained by the structure particularly pointed out in, or derivable from, the written description, the claims hereof, and the appended drawings.

A battery cell weld portion inspection apparatus according to an example embodiment of the present disclosure to accomplish the above object may include a coupling portion configured to be coupled to a connection member coupled to a weld portion, a shaft configured such that the coupling portion is coupled to a lower end of the shaft and such that a spring is added to an outer surface of the shaft, a sensor configured to measure the movement distance of the shaft, a sensing portion coupled to an upper end of the shaft such that the sensor can recognize the movement distance of the shaft, and a case configured to receive the shaft, the sensor, and the sensing portion.

The coupling portion may be formed in the shape of a hook, tongs, or a clamp.

A partition wall having a through-hole formed therein may be provided in the case, the spring of the shaft may be configured not to pass through the through-hole, and the shaft may be located in a state of extending through the through-hole.

The shaft may be moved downwards out of a lower part of the case depending on the magnitude of tensile force applied to the coupling portion, and the sensor may sense the position of the sensing portion.

The battery cell weld portion inspection apparatus may further include an alarm member configured to announce that the sensor has sensed the position of the sensing portion using a sound.

The sensor may be disposed so as to extend through a side wall of the case, and the position of the sensor may be adjustable.

When the coupling portion is separated from the connection member, the shaft may be moved upwards into the case by elastic force of the spring.

In addition, an example embodiment of the present disclosure provides a battery cell weld portion inspection method using the battery cell weld portion inspection apparatus. For example, the battery cell weld portion inspection method may include (a) coupling a coupling portion of the battery cell weld portion inspection apparatus to a connection member coupled to a weld portion, (b) moving the battery cell weld portion inspection apparatus upwards, and (c) interrupting upward movement of the battery cell weld portion inspection apparatus when the battery cell weld portion inspection apparatus generates an alarm.

In step (b), the battery cell weld portion inspection apparatus may be moved in a direction perpendicular to a plane in which the coupling portion is coupled to the connection member.

The alarm in step (c) may be a sound generated when a sensing portion is located adjacent to a sensor.

After step (c), coupling between the coupling portion and the connection member may be released.

The battery cell weld portion inspection method may further include adjusting the position of the sensor based on a normal tensile force value of the connection member before step (b).

The connection member may be any one selected from the group consisting of a wire welded to a battery cell, a busbar, and a metal plate, and, in step (c), a determination may be made that a welded state is normal when the state in which the connection member is coupled to the weld portion is maintained.

In addition, example embodiments of the present disclosure may provide various combinations of the above features.

As is apparent from the above description, when a battery cell weld portion inspection apparatus according to an example embodiment of the present disclosure is used, it is possible to apply uniform force to a connection member coupled to the weld portion irrespective of the skill of a worker who inspects the weld portion. Therefore, it is possible to improve reliability in inspecting the weld portion.

When the weld portion is inspected using the weld portion inspection apparatus, it is possible to accurately inspect whether the connection member is weakly welded.

In addition, it is possible to set tensile force applied to the connection member in the weld portion inspection apparatus to a uniform level, and therefore it is possible to prevent damage to the weld portion as the result of too strongly pulling the connection member during an inspection process.

In addition, it is possible to adjust the position of a sensor depending on desired welding strength, and therefore it is possible to inspect weld portions having various magnitudes of tensile force.

It is to be understood that both the foregoing general description and the following detailed description of the present disclosure are by way of example and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Now, example embodiments of the present disclosure will be described in detail with reference to the accompanying drawings such that the example embodiments of the present disclosure can be readily implemented by a person having ordinary skill in the art to which the present disclosure pertains. In describing the principle of operation of the preferred embodiments of the present disclosure in detail, however, a detailed description of known functions and configurations incorporated herein may be omitted when the same may obscure the subject matter of the present disclosure.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all example embodiments of the present disclosure, unless particularly restricted, and does not limit a specific embodiment.

Also, in the description of the disclosure and the claims of the present application, singular forms are intended to include plural forms unless mentioned otherwise.

Also, in the description of the disclosure and the claims of the present application, "or" includes "and" unless mentioned otherwise. Therefore, "including A or B" means three cases, namely, the case including A, the case including B, and the case including A and B.

Hereinafter, embodiments of the present disclosure will be described in detail with reference to the accompanying drawings.

Figure 1:
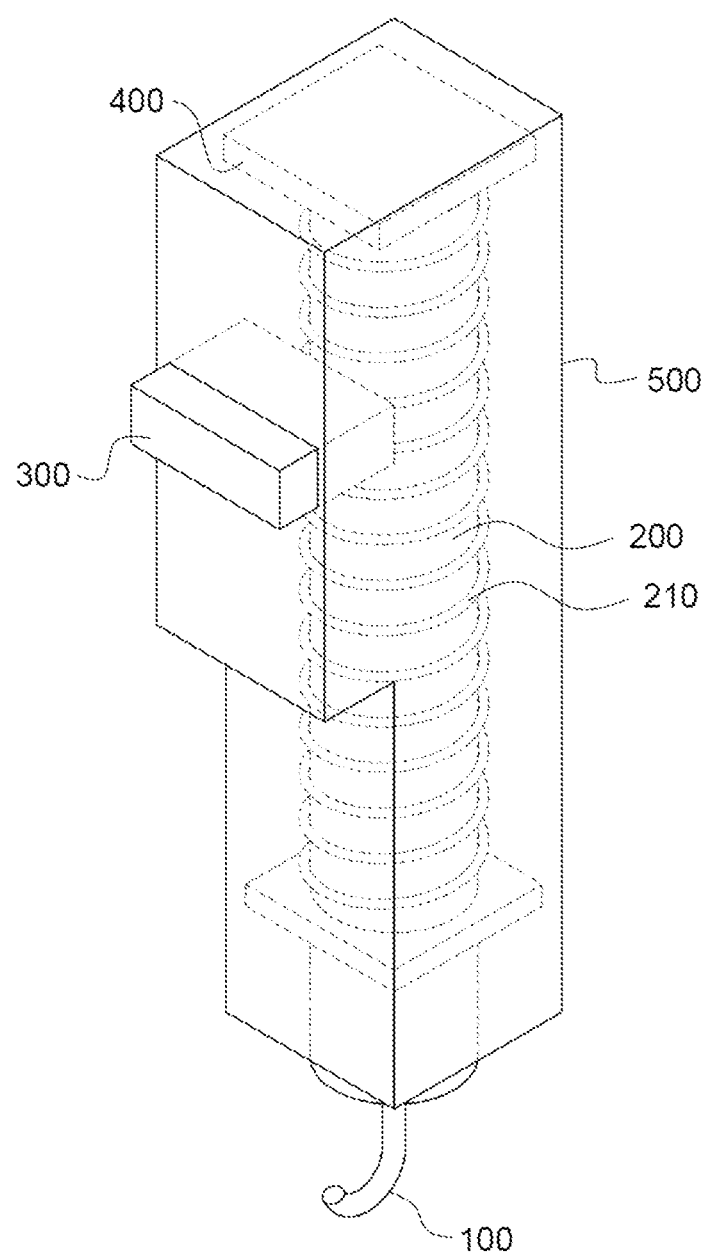
FIG. 1 is a perspective view of a battery cell weld portion inspection apparatus according to an example embodiment of the present disclosure.

FIG. 1 is a perspective view of a battery cell weld portion inspection apparatus according to an example embodiment of the present disclosure.

As shown in FIG. 1, the battery cell weld portion inspection apparatus according to an example embodiment of the present disclosure includes a coupling portion 100 configured to be coupled to a connection member coupled to a weld portion, a shaft 200 configured such that the coupling portion 100 is coupled to a lower end of the shaft 200 and such that a spring 210 is added to an outer surface of the shaft 200, a sensor 300 configured to measure the movement distance of the shaft 200, a sensing portion 400 coupled to an upper end of the shaft 200 such that the sensor 300 can recognize the movement distance of the shaft 200, and a case 500 configured to receive the shaft 200, the sensor 300, and the sensing portion 400.

The battery cell weld portion inspection apparatus according to an example embodiment of the present disclosure is configured to inspect the weld coupling state of a weld portion formed between a plurality of battery cells by wire welding or a weld portion formed between a metal plate and a plurality of battery cells by wire welding in the state in which the metal plate is added to the plurality of battery cells.

Specifically, when the coupling portion 100 is coupled to the connection member provided to inspect tensile force and then the battery cell weld portion inspection apparatus is moved upwards, the shaft 200 is moved to a lower part of the case 500 while the state in which the coupling portion 100 is coupled to the connection member is maintained. That is, the shaft 200 is moved downwards out of the lower part of the case 500 depending on the magnitude of tensile force applied to the coupling portion 100, and the sensor 300 may sense the sensing portion 400 that has approached the sensor 300.

When the magnitude of tensile force applied to the coupling portion 100 is large, the movement distance of the shaft 200 is increased. When the magnitude of tensile force applied to the coupling portion 100 is small, on the other hand, the movement distance of the shaft 200 is decreased.

When the sensing portion 400 coupled to the upper end of the shaft 200 is adjacent to the sensor 300 as the result of downward movement of the shaft 200, the battery cell weld portion inspection apparatus may generate a signal.

The signal may be a sound signal or a visual signal. Specifically, the battery cell weld portion inspection apparatus may include an alarm member configured to make a sound when the sensor senses the position of the sensing portion, for example when the sensor senses that the distance between the sensing portion and the sensor is the shortest.

Upon recognizing the signal, a worker stops upward movement of the battery cell weld portion inspection apparatus and checks whether the coupling state of the weld portion is maintained. When the state in which the connection member is coupled to the weld portion is maintained, a determination may be made that the welded state is normal.

In an example embodiment of the present disclosure, as described above, the sensing portion 400 is moved with the shaft 200 in a state of being coupled to the upper end of the shaft 200 and the sensor 300 configured to sense the position of the sensing portion 400 is provided. When the shaft 200 is moved a predetermined distance, therefore, a signal may be generated.

For example, since battery cell weld portions can be pulled with uniform force not only when the same worker repeatedly inspects the battery cell weld portions but also when different workers inspect the battery cell weld portions, the weld portions may be inspected under uniform conditions. Consequently, it is possible to improve accuracy and reliability in battery cell weld portion inspection.

In a concrete example, the coupling portion 100 may be formed in the shape of a hook so as to be easily coupled to a wire of the battery cell weld portion. Consequently, the hook-shaped coupling portion 100 may be coupled to the wire so as to lift the wire.

The connection member may be a busbar or a metal plate in addition to a wire welded to a battery cell, and therefore the coupling portion may be formed in the shape of tongs or a clamp so as to be easily coupled to the busbar or the metal plate.

Figure 2:
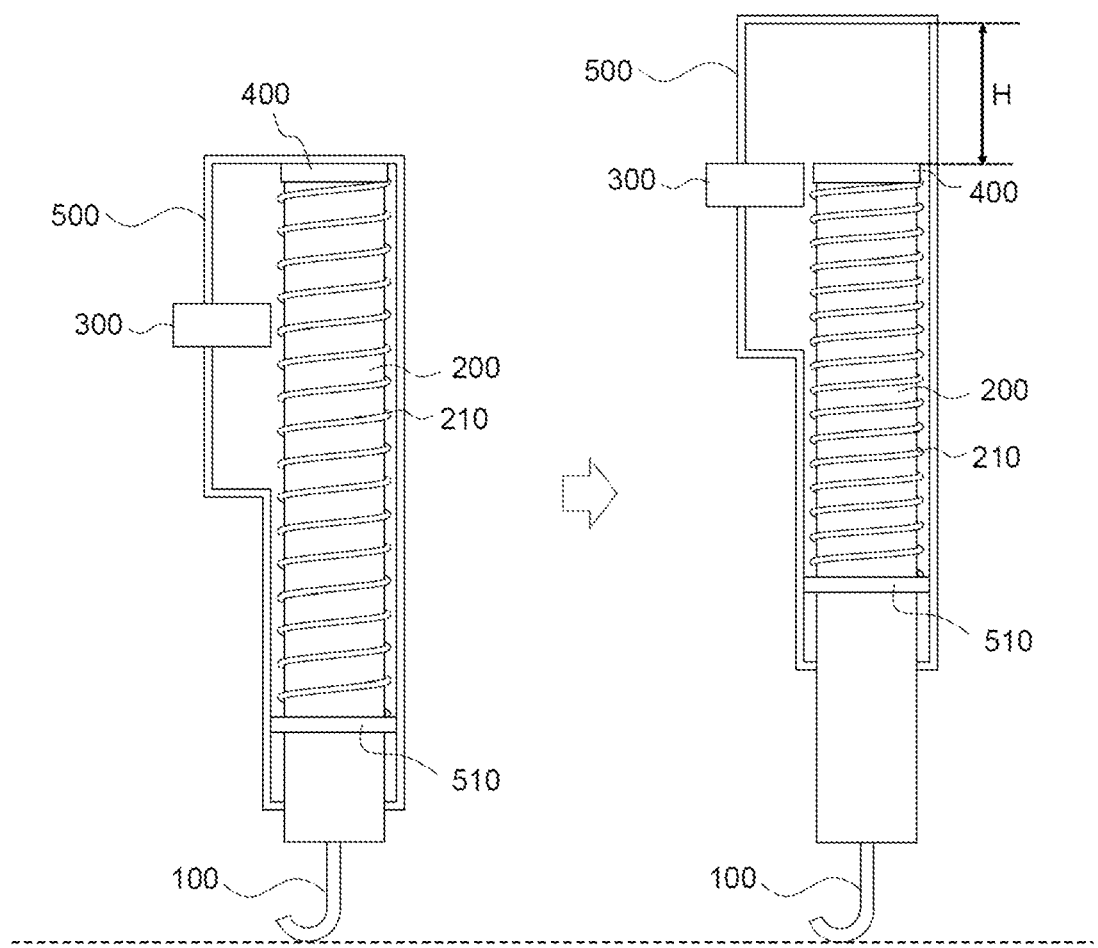
FIG. 2 is a side view showing the state of the battery cell weld portion inspection apparatus of FIG. 1 before and after inspection.

FIG. 2 is a side view showing the state of the battery cell weld portion inspection apparatus of FIG. 1 before and after inspection.

As illustrated in FIG. 2, the coupling portion 100 of the battery cell weld portion inspection apparatus is in a state of being coupled to the connection member (not shown). The left side figure shows the state in which the case 500 is not pulled, and the right side figure shows the state in which the case 500 has been pulled.

As the result of the upward movement of the case 500, the shaft 200 is relatively moved downwards by H, whereby the sensing portion 400 faces the sensor 300. At this time, the sensor 300 generates an alarm, whereby the worker may stop the movement of the case 500.

A partition wall 510 having a through-hole formed therein is provided in the case 500. The spring 210 of the shaft 200 cannot pass through the through-hole, and the shaft 200 is located in a state of extending through the through-hole. At this time, the spring 210 is in a compressed state. When the coupling portion 100 is separated from the connection member, therefore, the shaft 200 is moved upwards into the case 500 by the elastic force of the spring 210.

The above-described process may be repeatedly performed, and therefore it is possible to rapidly and accurately inspect a plurality of weld portions.

In a concrete example, when the movement distance of the shaft is increased or decreased as the result of the sensor being moved upwards or downwards, an alarm is given, whereby the battery cell weld portion inspection apparatus according to an example embodiment of the present disclosure may be applied to weld portions that require various magnitudes of coupling force.

Specifically, the sensor 300 may be disposed so as to extend through a side wall of the case 500, and a slot hole may be formed in the case 500 such that the position of the sensor 300 can be adjusted in an upward-downward direction.

The position of the sensor 300 may be adjusted using a part exposed outside the case 500, and the position of the sensing portion 400 may be sensed using a part that faces the sensing portion 400 in the case 500.

The structure capable of adjusting the position of the sensor 300 is not particularly restricted as long as the structure is movable in the state in which the sensor 300 is disposed so as to extend through the case 500.

When a reference value of the tensile force of the weld portion is changed, the contraction distance due to the tensile force may be calculated using the spring constant k of the spring 210 and the position of the sensing portion 400 may be microscopically adjusted using a push pull gauge, as a method of adjusting the position of the sensor 300. For example, the spring constant k of the spring 210 according to an example embodiment of the present disclosure may be 0.29 N/mm.

Figure 3:
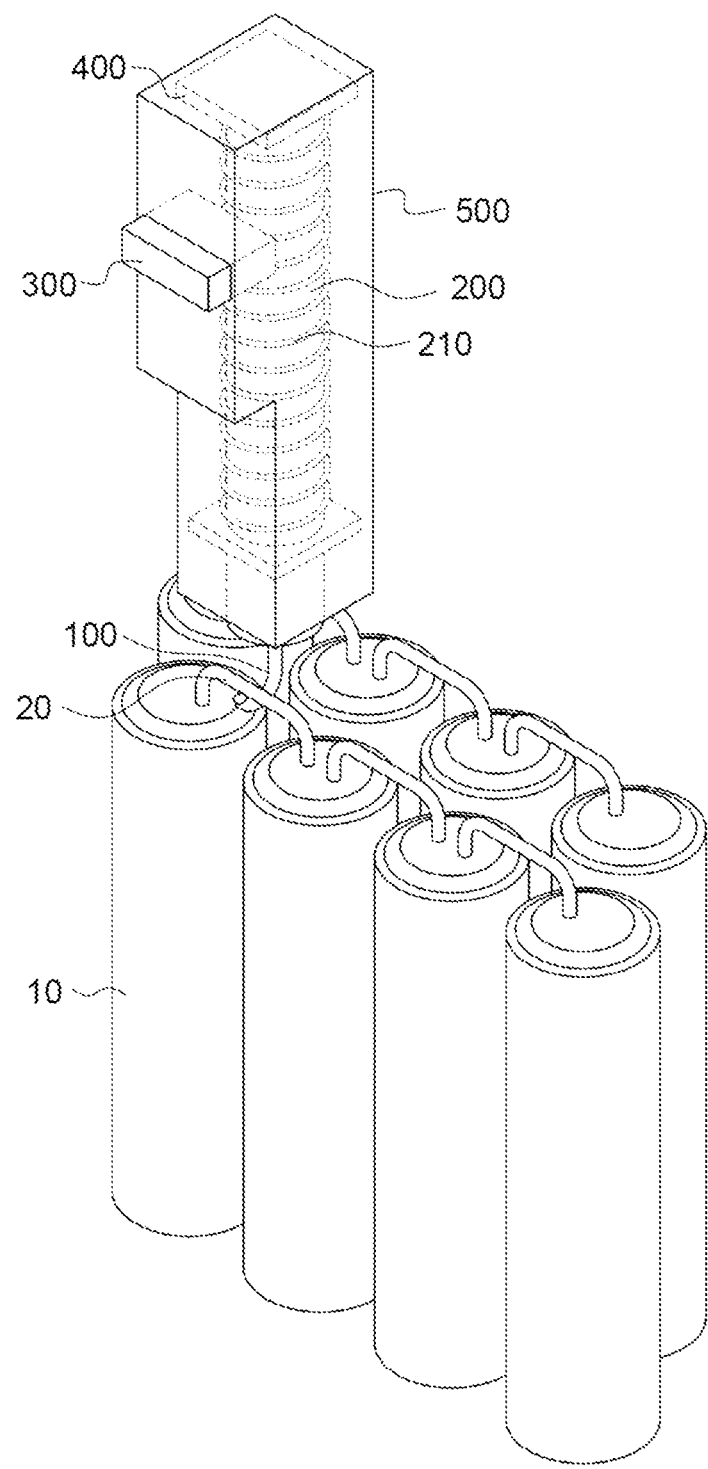
FIG. 3 is a perspective view showing the state in which the battery cell weld portion inspection apparatus of FIG. 1 is coupled to a battery cell connection member.

FIG. 3 is a perspective view showing the state in which the battery cell weld portion inspection apparatus of FIG. 1 is coupled to a battery cell connection member.

As shown in FIG. 3, eight cylindrical battery cells 10 are disposed such that an upper part of each of the cylindrical battery cells 10 faces upwards, and neighboring ones of the cylindrical battery cells 10 are connected to each other via a wire-type connection member 20, which is attached to top caps of the cylindrical battery cells 10.

The battery cells to which the battery cell weld portion inspection apparatus according to an example embodiment of the present disclosure is applied are not limited to cylindrical battery cells, and the battery cell weld portion inspection apparatus according to an example embodiment of the present disclosure may be applied to prismatic battery cells. The number of battery cells shown in FIG. 3 is illustrative and is by way of example. In addition, the battery cells may be connected to each other in parallel, in series, or in parallel and series. A metal plate or a busbar may be disposed above the battery cells, and the metal plate or the busbar may be connected to the battery cells by wire welding.

The coupling portion 100 of the battery cell weld portion inspection apparatus may be coupled to the connection member 20 so as to wrap the connection member 20, and the battery cell weld portion inspection apparatus may be moved in a direction perpendicular to a plane in which the coupling portion 100 is coupled to the connection member 20. At this time, the sensing portion 400 approaches the sensor 300, and the sensor 300 senses the sensing portion 400 and transmits a signal to the alarm member (not shown), which generates an alarm sound. Upon recognizing the signal, the worker stops the upward movement of the battery cell weld portion inspection apparatus.

When maintenance of the state in which the connection member 20 is coupled to the weld portion is checked, a determination may be made that the welded state is normal. After coupling between the connection member 20 and the coupling portion 100 is released, a weld portion for another connection member 20 adjacent thereto may be repeatedly inspected.

When desired tensile force is increased at the weld portion to which the connection member is coupled, the sensor may be moved downwards. When desired tensile force is decreased at the weld portion to which the connection member is coupled, on the other hand, the sensor may be moved upwards. When it is necessary to adjust the position of the sensor 300, therefore, it is possible to adjust the position of the sensor 300 before or after the battery cell weld portion inspection apparatus is coupled to the connection member.

Hereinafter, the present disclosure will be described with reference to an example. This example is provided only for easier understanding of the present disclosure and should not be construed as limiting the scope of the present disclosure.

Experimental Example

A battery cell sample having electrical connection formed by wire welding was prepared, a pulling test was performed on a wire weld portion, and a determination was made that the wire weld portion was normal when the tensile force was 300 gf to 400 gf. The following experiments were performed based on the above criterion.

Comparative Example

A pulling test using tweezers was performed on each of 10 wire weld portions.

The pulling test was performed using a method of plucking the tweezers in the state in which the tweezers were held under a wire of each of the wire weld portions. As the result of the pulling tests using the tweezers, it was confirmed that all of the wire weld portions were normal.

The tensile force of each of the 10 wire weld portions was measured using a push pull gauge, and the magnitude of the tensile force and the result of determination as to whether the weld portion was good or bad are shown in Table 1 below.

EXAMPLE

A battery cell weld portion inspection apparatus according to an example embodiment of the present disclosure was prepared, and the position of a sensor was set such that the tensile force ranged from 300 gf to 400 gf.

A coupling portion of the battery cell weld portion inspection apparatus was coupled to each of 10 wire weld portions, a test of pulling the wire weld portion upwards in a vertical direction was performed until the sensor sensed a sensing portion and generated an alarm.

The magnitude of the tensile force of each of the 10 wire weld portions measured by the example battery cell weld portion inspection apparatus, and the result of determination as to whether the weld portion was good or bad are shown in Table 1 below.

TABLE 1

| | Push pull gauge (Comparative Example) | | Battery cell weld portion inspection apparatus (Example) | |
|---|---|---|---|---|
| | Tensile force (gf) | Result | Tensile force (gf) | Result |
| 1 | 310 | Good | 300 to 400 | Good |
| 2 | 250 | Bad | 300 to 400 | Good |
| 3 | 360 | Good | 300 to 400 | Good |

TABLE 1-continued

| | Push pull gauge (Comparative Example) | | Battery cell weld portion inspection apparatus (Example) | |
|---|---|---|---|---|
| | Tensile force (gf) | Result | Tensile force (gf) | Result |
| 4 | 450 | Bad | 300 to 400 | Good |
| 5 | 420 | Bad | 300 to 400 | Good |
| 6 | 350 | Good | 300 to 400 | Good |
| 7 | 430 | Bad | 300 to 400 | Good |
| 8 | 280 | Bad | 300 to 400 | Good |
| 9 | 440 | Bad | 300 to 400 | Good |
| 10 | 320 | Good | 300 to 400 | Good |

Table 1 above shows that six of the weld portions determined to be good as the result of the pulling tests using the tweezers in Comparative Example were determined to be bad in tests using the battery cell weld portion inspection apparatus according to an example embodiment of the present disclosure.

If the worker manually performs the tests using the tweezers, as described above, it is difficult to inspect the weld portions using uniform force, and therefore it is necessary to perform additional tests in order to guarantee reliability in weld portion inspection.

In contrast, when the battery cell weld portion inspection apparatus according to an example embodiment of the present disclosure is used, as in Example, it is possible to perform a test using an easy method of terminating the test when an alarm is generated within a predetermined range of tensile force and to maintain uniform magnitude of the tensile force applied to each weld portion. Therefore, repetitive experiments are unnecessary, and reliability in inspection can be better ensured.

When the battery cell weld portion inspection apparatus according to an example embodiment of the present disclosure and the battery cell weld portion inspection method using the same are used, as described above, it is possible to maintain uniform magnitude of tensile force applied to the battery cell weld portion irrespective of workers, and therefore it is possible to improve accuracy and reliability in welding inspection.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

DESCRIPTION OF REFERENCE NUMERALS

10: Battery cell
20: Connection member
100: Coupling portion
200: Shaft
210: Spring
300: Sensor
400: Sensing portion
500: Case

What is claimed is:

1. A battery cell weld portion inspection apparatus, comprising:
    a coupling portion configured to be coupled to a connection member coupled to a weld portion of a battery cell;
    a shaft including a lower end coupled to the coupling portion;
    a spring disposed around an outer surface of the shaft;
    a sensor configured to measure a movement distance of the shaft;
    a sensing portion coupled to an upper end of the shaft, the sensor being configured to measure the movement distance of the shaft based on a position of the sensing portion; and
    a case configured to receive the shaft, the sensor, and the sensing portion.

2. The battery cell weld portion inspection apparatus of claim 1, wherein the coupling portion is formed in a shape of a hook, tongs, or a clamp.

3. The battery cell weld portion inspection apparatus of claim 1, wherein:
    the case includes a partition wall having a through-hole,
    the spring is configured not to pass through the through-hole, and
    the shaft is configured to extend out of the case or retract into the case through the through-hole.

4. The battery cell weld portion inspection apparatus of claim 1, wherein:
    the sensor extends through a side wall of the case, and
    a position of the sensor is adjustable.

5. The battery cell weld portion inspection apparatus of claim 1, wherein, when the coupling portion is separated from the connection member, the shaft is configured to move upward into the case by an elastic force of the spring.

6. The battery cell weld portion inspection apparatus of claim 1, wherein:
    the shaft is configured to move downward out of a lower part of the case based on a magnitude of tensile force applied to the coupling portion, and
    the sensor is configured to sense the position of the sensing portion.

7. The battery cell weld portion inspection apparatus of claim 6, further comprising an alarm member configured to generate a sound to announce that the sensor has sensed the position of the sensing portion.

8. A battery cell weld portion inspection method using the battery cell weld portion inspection apparatus according to claim 1, the battery cell weld portion inspection method comprising:
    coupling a coupling portion of the battery cell weld portion inspection apparatus to a connection member coupled to a weld portion of a battery cell;
    moving the battery cell weld portion inspection apparatus upwards; and
    interrupting upward movement of the battery cell weld portion inspection apparatus if the battery cell weld portion inspection apparatus generates an alarm.

9. The battery cell weld portion inspection method of claim 8, wherein the coupling of the coupling portion includes moving the battery cell weld portion inspection apparatus in a direction perpendicular to a plane in which the coupling portion is coupled to the connection member.

10. The battery cell weld portion inspection method of claim 8, further comprising, after the interrupting of the upward movement, releasing the coupling between the coupling portion and the connection member.

11. The battery cell weld portion inspection method according to claim 8, wherein:
    the connection member is one of a wire welded to a battery cell, a busbar, and a metal plate, and
    the interrupting of the upward movement includes determining that a welded state is normal if a state in which the connection member is coupled to the weld portion is maintained.

12. The battery cell weld portion inspection method of claim 8, further comprising generating a sound with the alarm if the sensing portion is sensed to be adjacent to the sensor.

13. The battery cell weld portion inspection method of claim 12, further comprising adjusting a position of the sensor based on a normal tensile force value of the connection member before the moving.

\* \* \* \* \*